United States Patent [19]

Tanaka et al.

[11] 4,055,235
[45] Oct. 25, 1977

[54] BICYCLE BRAKE DEVICE WITH INCREASED BRAKING POWER

[75] Inventors: Hiroshi Tanaka, Kawasaki; Noriyuki Ogisu, Tokyo; Akira Urakawa, Yamato, all of Japan

[73] Assignee: Nichibei Fuji Cycle Co., Ltd., Tokyo, Japan

[21] Appl. No.: 703,588

[22] Filed: July 8, 1976

[30] Foreign Application Priority Data

Nov. 21, 1975 Japan .............................. 50-157405[U]

[51] Int. Cl.² .............................................. B62L 1/12
[52] U.S. Cl. .................................... 188/24; 188/72.2; 188/73.1
[58] Field of Search .................... 188/24, 72.2, 73.1, 188/250 B

[56] References Cited

U.S. PATENT DOCUMENTS

| 3,860,094 | 1/1975 | Breton ...................... 188/250 B X |
| 3,869,024 | 3/1975 | Hauth et al. ...................... 188/72.2 |

FOREIGN PATENT DOCUMENTS

| 900,660 | 10/1944 | France ...................... 188/24 |
| 898,521 | 7/1944 | France ...................... 188/72.2 |
| 1,194,744 | 5/1959 | France ...................... 188/72.2 |
| 210,911 | 2/1924 | United Kingdom ...................... 188/24 |

Primary Examiner—George E. A. Halvosa
Attorney, Agent, or Firm—Toren, McGeady and Stanger

[57] ABSTRACT

A bicycle brake device for increasing the braking power to be applied to the wheel of a bicycle which has caliper type brake arms mounted on the seat stay bridge by a bolt about which the caliper arms are pivotally movable. A cage is mounted on the ends of the caliper arms and has an open end and a closed end. A brake shoe is slidably carried for axial movement in the cage through the open end and has a front end and a rear end oriented with the open and closed end respectively of the cage. A brake block is carried in the brake shoe and has a surface for engaging the rim to apply friction forces for braking action. A cam is mounted at the front end of the brake shoe for engaging the seat stay upon forward sliding movement of the brake shoe in the cage as a result of friction forces between the brake block and the rim when the block engages the rim. A threaded bolt projects from the rear end of the brake shoe and protrudes through an opening in the closed end of the cage, a spring being coiled about the protruding bolt for returning the brake shoe to its initial position after the cam has engaged the seat stay.

3 Claims, 7 Drawing Figures

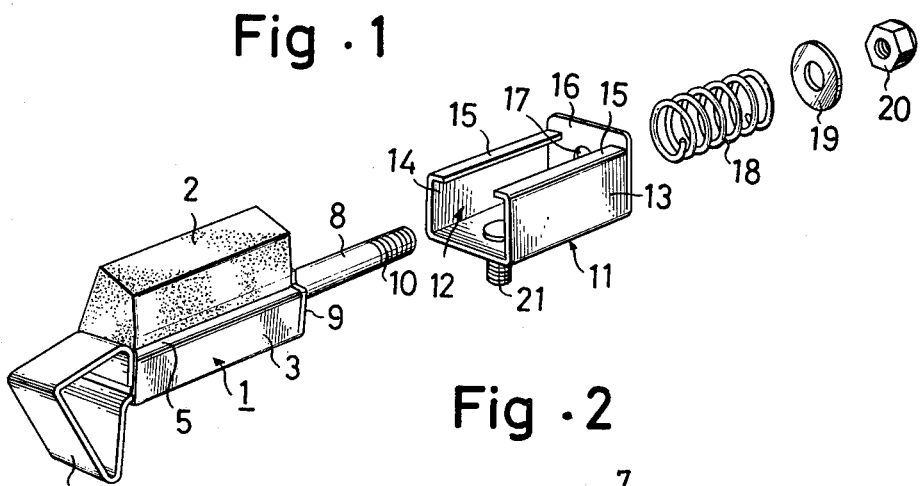
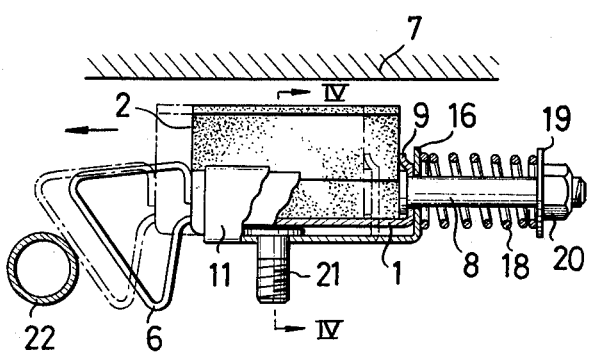
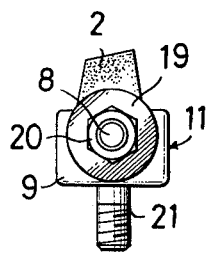
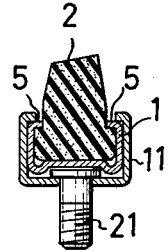

BICYCLE BRAKE DEVICE WITH INCREASED BRAKING POWER

BACKGROUND OF THE INVENTION

The present invention is intended to increase the pressing power of a bicycle's brake block carried at the ends of a bicycle caliper brake device, when it is pressed against the rim in order to apply a brake. More particularly, the invention provides for the displacement of the brake shoe which supports the brake block in a direction parallel to the direction of the rim's rotation. Simultaneously the invention provides change of this transferring power into the kind of power that presses the brake shoe in the direction which intersects the rim's moving direction so that it results in greater power to press the brake block against the rim.

Conventionally, the caliper brake device is fastened at the seat stay bridge of the seat stay by an attaching bolt, which, in turn, serves as the pivoting center of right and left arms. By operating the brake lever attached to the handle, the brake shoe which supports the brake block, and which is fixed at the ends of the arms, drives itself through the arms so that it is pressed against the rim, resulting in a braking action.

However, since in this kind of caliper brake, the pressing power of the brake block against the rim depends solely on the grasping power of the hands which operate the brake lever, a skid may occur in the friction plane between the rim and the brake block, which, in turn, results in elongating the braking distance of a bicycle. Especially, in rainy weather, this kind of brake device is highly dangerous, for the bicycle cannot make a sudden stop, the skid being aggravated by the wet rims. It is accordingly an object of this invention to avoid the above noted dangerous condition by increasing the pressing power of the brake block against the rim. More particularly, the object can be achieved only by reforming the brake shoe fixed at the arms, without having to reform the caliper brake itself.

SUMMARY OF THE INVENTION

The foregoing object is generally accomplished by strengthening the pressuring power of the brake of a bicycle. More specifically, the invention provides for increasing the braking pressure of the brake block by the pressing function of the seat stay against the brake shoe, which, in turn, is pressed hard against the rim of the rotating wheel. Also, in this invention, it is possible to strengthen the pressuring power by reforming only the brake block and brake shoe, not requiring any large structural alteration on the caliper brake itself.

Moreover, this invention is characterized by two parts fixed at the ends of the caliper arms by a brake shoe pin and a nut which fastens it. There are a brake shoe and a cage which receives it. Strengthening the pressure power of the brake, is possible only because of the use of these two cooperating parts.

A wedge shaped cam is mounted at the front part of the brake shoe which supports the brake block, and a threaded bolt is mounted at its rear part in such a manner that it is parallel to the direction of the axis of said brake shoe. A brake shoe structured in this manner is received in the cage in such a way that it can slide back and forth, with the threaded bolt protruding from the rear of the cage. A spring is coiled about this protruding part which, in turn, is supported through a washer by a nut screwed onto the threads of the bolt. At the bottom of the cage is a brake shoe pin which fixes the brake shoe receiving cage at the ends of the arms of the caliper brake by a nut.

In the drawings,

FIG. 1 is an exploded perspective view separately showing each part that composes the present invention;

FIG. 2 is a plan view, partly in cross section, which illustrates the positions of the rim, seat stay, brake shoe and cage;

FIG. 3 is a rear elevational view of the way the brake shoe is received within the cage;

FIG. 4 is a cross sectional view of FIG. 2, taken along line IV—IV, of FIG. 2;

DETAILED DESCRIPTION OF THE INVENTION

Figure 5:
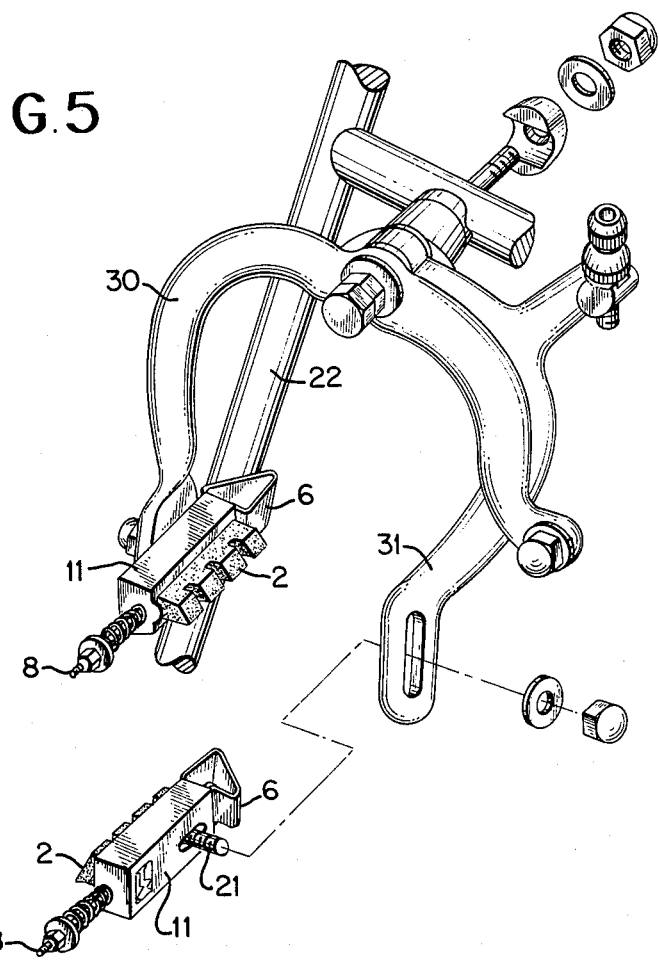
FIG. 5 is a partially exploded perspective view showing the caliper arms, seat stay and brake shoes mounted on the arms.
Figure 6:
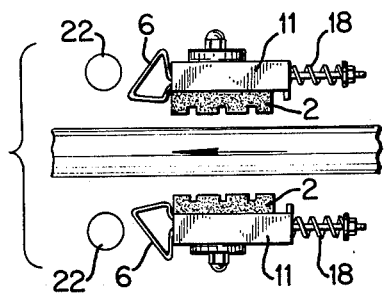
FIG. 6 is a plan view showing the brake shoes on opposite sides of a rim before the braking action.
Figure 7:
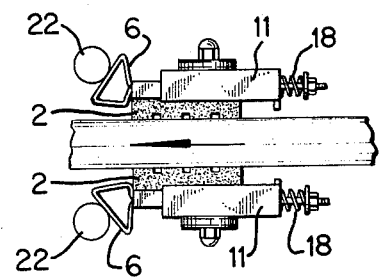
FIG. 7 is a plan view similar to that of FIG. 6 showing the invention in a position during the braking operation.

In the exemplary embodiment of the invention as disclosed in the drawings, reference numeral 1 indicates a brake shoe, while reference numeral 2 indicates a brake block. The brake show is of metallic material, shaped like a box. The upper edges of both sides of said brake shoe are bent inwardly as shown in FIG. 4 so that it receives and supports brake block 2. At the front of brake shoe 1, that is, in the running direction of a bicycle, is located a wedge-shaped cam 6 which is slanted towards the outside from its edge in a direction opposite to that of rim 7. It is also possible to form this cam by expanding and bending the metal which constitutes the bottom of brake shoe 1. There is a hole in the rear wall 9 of brake shoe 1 as shown in FIG. 2 into which is inserted a flanged bolt 8 with screw threads. The bolt 8, thus, protrudes from the rear wall 9, and screw thread 10 is carried on its edge.

Box-shaped cage 11 is open-ended at the front end thereof and there is a hole at its rear wall. The upper edges 15, 15 of sides 13, 14 of said cage are bent inwardly.

As can be seen in FIG. 2, cage 11 and brake shoe 1 are joined by inserting brake shoe 1 into cage 11 through the open end 12 of the cage 11 in such manner that threaded bolt 8 of said brake shoe protrudes from the cage through hole 17 at rear wall 16 of the cage. Then nut 20 is screwed onto thread 10 of the bolt 8 around which is coiled spring 18. Joining of these two parts is, thus, complete. In the figures reference numeral 21 indicates a brake shoe pin which is located at the bottom of cage 11. The entire body of this invention is attached to the arms 30 and 31 of the caliper brake (shown in FIG. 5) by this brake show pin.

Since this invention is structured as described above, according to the operation of the brake lever on the rotating rim 7, the distance between the arms 30, 31 of the caliper brake become narrower, and cage 11 attached at the edges of the arms and brake block 2 of brake shoe 1 located inside of the cage are pressed against the rim 7. Then as a result of the friction caused between the brake block and rim 7, brake shoe 1 is pulled to the left side of FIG. 2, that is, in the direction of the rim's rotation, against the force of spring 18, and the slanted surface of cam 6 located at the front of the brake shoe touches seat stay 22. Since the surface of cam 6 which touches the seat stay is slanted, the brake shoe, which is pressed strongly against the seat stay, operates strongly on said rim, which results in increasing the braking effect. When the brake lever is released, brake block 2 becomes detached from rim 7, and brake shoe 1 returns to its original position within cage 11 (to the right side of FIG. 2) by the operation of spring 18.

In this invention, as can be understood from the above explanation, the braking effect is increased by the strong pressing operation of brake shoe 1 against rim 7, when slanted surface of cam 6 is pressed against seat stay 22. Moreover, because the transfer of brake block 2 caused by the friction between the rotating rim and brake block 2 is carried out by sliding brake shoe 1 and cage 11, it is not only assured that the transfer will be done in the direction which is exactly parallel to the rim, but also it is possible to attain its aim just by improving the parts to be attached at the edges of the arms. Thus, the invention is most suitable for bicycle brakes to strengthen their pressuring power.

As many apparently widely different structures of this invention may be employed without departing from the spirit thereof, it is to be understood that the invention is not limited to the specific embodiments as described above and shown in figures thereof except as defined in the appended claims.

What is claimed is

1. A bicycle brake device having increased braking power to be applied to the wheel rim of a bicycle, comprising a pair of caliper type brake arms mounted to the seat stay bridge of the seat stay of a bicycle body by an attaching bolt for pivotal movement of said arms about said bolt so that the ends thereof are movable toward and away from said bicycle wheel rim for applying braking pressure to said rim, a cage mounted on the ends of said caliper arms by a brake shoe pin and nut, said cage being open at one end thereof and closed at the other end thereof, a brake shoe slidably carried for axial movement in said cage through said open end thereof, said brake shoe having a front end and a rear end oriented with said open end and closed end respectively of said cage, the forward rotation of said wheel being in a direction from said rear end of said brake shoe toward said front end thereof, a brake block carried in said brake shoe having a surface for engaging said rim to apply friction forces thereto for braking action, a wedge shaped cam mounted at said front end of said brake shoe for engaging said seat stay upon forward sliding movement of said brake shoe in said cage as a result of friction forces between said brake block and said rim when said brake block engages said rim, so that when said wedge shaped cam engages said seat stay a component of a reaction force urges said brake block against the wheel rim with increased pressing power to increase braking power, a threaded bolt projecting from said rear end of said brake shoe and protruding through an opening in said closed end of said cage, and a spring coiled about said bolt between said cage and means on said bike for returning said brake shoe to its initial position after said cam has engaged said seat stay.

2. The bicycle brake device according to claim 1 wherein said brake shoe is formed of metal having a box-likeshape, and wherein said cam has a slanted cam surface provided at the front of said brake shoe, said cam surface being formed by expanding and bending the metal which constitutes the bottom of said box-like brake shoe.

3. The bicycle brake device according to claim 1 wherein said cage which receives said brake shoe has a box-like shape with two opposed sides thereof having upper edges which are bent inwardly for holding said brake shoe therein to permit axial sliding movement of said brake shoe in said cage.

* * * * *